(12) United States Patent
Wu

(10) Patent No.: US 6,178,638 B1
(45) Date of Patent: *Jan. 30, 2001

(54) FABRICATION METHOD FOR A FLANGE-TYPE BALL VALVE

(76) Inventor: Lei-Jui Wu, No. 13, Fang Yuan Hsiang, Hou Liao Tsun, Kung Chu 4 Road, Chang Hua Hsien (TW)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/273,575

(22) Filed: Mar. 22, 1999

(51) Int. Cl.$^7$ ........................................... B23P 15/00
(52) U.S. Cl. ........................... 29/890.126; 29/890.132
(58) Field of Search ................ 29/890.12, 890.126, 29/890.13, 890.132; 72/377

(56) References Cited

U.S. PATENT DOCUMENTS

| | | | | |
|---|---|---|---|---|
| 1,663,784 | * | 3/1928 | Washburne | 29/890.13 |
| 1,828,478 | * | 10/1931 | Sparks | 29/890.13 |
| 1,836,384 | * | 12/1931 | Mohr | 29/890.13 |
| 3,411,746 | * | 11/1968 | Scaramucci | 251/315.08 |
| 3,545,721 | * | 12/1970 | Shafer | 251/309 |
| 3,819,150 | * | 6/1974 | Kajrup | 29/315.15 |
| 3,846,885 | * | 11/1974 | Perry | 29/890.13 |
| 4,918,969 | * | 4/1990 | Takeuchi et al. | 72/377 |
| 5,890,286 | * | 4/1999 | Eklof | 29/890.13 |
| 5,894,663 | * | 4/1999 | Evans et al. | 29/890.126 |

* cited by examiner

Primary Examiner—Irene Cuda
Assistant Examiner—Trinh Nguyen
(74) Attorney, Agent, or Firm—Dougherty & Troxell

(57) ABSTRACT

A fabrication method for an improved structure practical forged one-piece flange-type ball valve that consists of the forging the initial two blanks of the water inlet seat and the ball valve seat for a one-piece flange-type ball valve, based on the blueprints of conventional one-piece flange-type ball valves, with the water inlet seat having a left pipeline connection section already formed inside and the ball valve seat having a ball valve chamber, its contiguous water outlet port, and a right pipeline connection section already formed inside. To facilitate easier finishing, a shallower mating section is formed at the front end of the water inlet seat for contact with the ball valve chamber of the ball valve seat. A left water-tight gasket containment recess is then lathed in the mating section end surface of the water inlet seat and external threads are died along the outer sides of the mating section. Furthermore, internal threads are tapped in the connection hole at the front end of the ball valve chamber of the ball valve seat to enable the screw fastening of the external threads of the water inlet seat into the connection hole. A right water-tight casket containment recess is formed at the adjoining end surfaces between the water outlet port and the ball valve chamber and then a handle mounting hole is drilled. After the left and the right water-tight gaskets are inserted into the left and the right water-tight gasket containment recesses, the ball valve is placed inside the ball valve chamber. Then, the external threads of the water inlet seat mating section are coated with a thread locking agent and screw fastened to the internal threads in the connection hole of the ball valve seat which causes the left and the right water-tight gaskets to rest against the two spherical surfaces of the ball valve. As such, the ball valves fabricated according to the method of invention herein retain forged material strength, while avoiding the occurrence of pitting, reducing defect rates, allowing easier finishing, lessening material wastage, lowering production costs and, furthermore, minimizing component fabrication and shortening the manufacturing time.

2 Claims, 6 Drawing Sheets

FABRICATION METHOD FOR A FLANGE-TYPE BALL VALVE

BACKGROUND OF THE INVENTION

1) Field of the Invention

The invention herein relates to a fabrication method for a flange-type ball valve that consists of the forging the initial two blanks of the water inlet seat and the ball valve seat for a one-piece flange-type ball valve, based on the blueprints of conventional one-piece flange-type ball valves, with the water inlet seat having a left pipeline connection section already formed inside and the ball valve seat having a ball valve chamber, its contiguous water outlet port, and a right pipeline connection section already formed inside. To facilitate easier finishing, a shallower mating section is formed at the front end of the water inlet seat for contact with the ball valve chamber of the ball valve seat. A left water-tight gasket containment recess is then lathed in the mating section end surface of the water inlet seat and external threads are died along the outer sides of the mating section. Furthermore, internal threads are tapped in the connection hole at the front end of the ball valve chamber of the ball valve seat to enable the screw fastening of the external threads of the water inlet seat into the connection hole. A right water-tight gasket containment recess is formed at the adjoining end surfaces between the water outlet port and the ball valve chamber and then a handle mounting hole is drilled. After the left and the right water-tight gaskets are inserted into the left and the right water-tight gasket containment recesses, the ball valve is placed inside the ball valve chamber. Then, the external threads of the water inlet seat mating section are coated with a thread locking agent and screw fastened to the internal threads in the connection hole of the ball valve seat which causes the left and the right water-tight gaskets to rest against the two spherical surfaces of the ball valve. As such, the ball valves fabricated according to the method of invention herein retain forged material strength, while avoiding the occurrence of pitting, reducing defect rates, allowing easier finishing, lessening material wastage, lowering production costs and, furthermore, minimizing component fabrication and shortening the manufacturing time.

2) Description of the Prior Art

Conventional metal flange-type valves are generally all cast fabricated because a one-piece flange-type ball valve can be produced as a single structural entity and, furthermore, most of the interior and exterior features of the said initial blanks are already formed after being cast into shape and only require the finishing and drilling of various sections to complete the valve. However, cavitation readily occurs during the casting process and to lessen the fine surface pitting resulting from the said cavitation, the initial blanks are given additional thickness and then the actual thickness required is achieved by interior and exterior finishing. While this reduces fine pitting, the material removed constitutes an enormous waste and, furthermore, the complete elimination of the said pitting is not possible. As a result, defect rates tend to increase and defective products that are marketed may leak. Soldering or welding during maintenance could unavoidably result in explosions or fires, which are common disasters often observed.

Due to the said shortcomings of ball valves that are fabricated by casting, the industry expected to avoid pitting flaws by forging the valve blocks. Referring to FIG. 1, the initial blank A of a forged one-piece flange-type valve of typical manufacture achieved the objective of single-entity shaping while still utilizes horizontal forging technology, but because of the limitations on easily opening the dies after forming, a die removal angle had to be included inside the die which left the vertically oriented border of the die release angles A1 that facilitated the opening of the die and, furthermore, the water inlet port and the water outlet port A2 and A3 as well as the ball valve chamber A4 could not be formed at the same time the one-piece flange-type ball valve A was forged and the said one-piece flange-type ball valve A remained an initial blank of solid construction that still required the forming of the internal aspects of a ball valve such as the removal of the invisible line section A5; referring to FIG. 2, to enable the placement of the ball valve of the ball valve chamber A4, the plug C was additionally fabricated and, furthermore, external threads C1 had to be tapped on the outer section and the right water-tight gasket containment recess C2 had to be formed on the front end; a left water-tight gasket containment recess A41 had to be formed at the bottom end of the ball valve chamber A4 which required the machining of considerable depth in the bottom end, with the said depth involving a high degree of difficulty that was obviously not a simple finishing task; then, the external threads C1 of the plug C were coated with a thread locking agent a fastened to the internal threads A31 in the water outlet port A3 at the right side of the one-piece flange-type ball valve A, causing the water-tight gasket D of the plug C to rest against the spherical surface of the ball valve B; due to the conventional structure, the said plug C is indispensable to the one-piece flange-type ball valve, with the fabrication and machining of the said plug C increasing the both production cost and time; therefore, conventional one-piece flange-type ball valves, whether cast or forged, involves a very high material cost, finishing is inconvenient due the weight that must be conveyed and, furthermore, the finishing procedure is quite complex and results in a wasting of material; forging was assumed to be a solution for the shortcomings of cast fabrication, but since the material cost remained high, finishing required much time, and the price was expensive, the product did not impress users and could not be successfully promoted to consumers because further improvement was still necessary.

Therefore, in view of the said shortcomings, the inventor of the invention herein addressed the said drawbacks by conducting research based on many years of experience in the field of ball valve production, with efforts finally culminated in the research and development of the invention herein which is hereby submitted in application for the granting of the commensurate patent rights.

SUMMARY OF THE INVENTION

The primary objective of the invention herein is to provide a fabrication method for an improved structure practical forged one-piece flange-type ball valve that consists of the forging the initial two blanks of the water inlet seat and the ball valve seat for a one-piece flange-type ball valve, based on the blueprints of conventional one-piece flange-type ball valves, with the water inlet seat having a left pipeline connection section already formed inside and the ball valve seat having a ball valve chamber, its contiguous water outlet port, and a right pipeline connection section already formed inside; to facilitate easier finishing, a shallower mating section is formed at the front end of the water inlet seat for contact with the ball valve chamber of the ball valve seat, enabling a left water-tight gasket containment recess to be formed in the mating section end surface of the water inlet seat and the dieing of external threads along the outer sides of the mating section; at the same time, internal threads are tapped in the connection hole at the front end of the ball valve chamber of the ball valve seat to enable the screw fastening of the external threads of the water inlet seat into the connection hole and a right water-tight gasket containment recess is formed at the adjoining end surfaces between the water outlet port and the ball valve chamber; and since the finishing and fabrication is simple, the finishing speed is accelerated and, furthermore, defect rates and material wastage are reduced and storage volume is minimized.

Another objective of the invention herein is to provide a fabrication method for an improved structure practical forged one-piece flange-type ball valve that consists of forging the initial two blanks of the water inlet seat and the ball valve seat for a one-piece flange-type ball valve, of which the water inlet port of the water inlet seat and the water outlet port of the ball valve seat are of the same bore diameters and, after being placed inside the ball valve chamber, the ball valve rests against the water-tight gasket of the water outlet port, then the mating section of the water inlet seat is inserted and fastened into the connection hole of the ball valve seat, causing the said water-tight gaskets at the said two sides to be flush against the ball valve, and thereby achieve rapid assembly and, furthermore, reduce the plug component portions and the respective finishing time to effectively reduce both the production cost and the defect rate.

To enable a further understanding of the structure and operation of the fabrication method of the invention herein, the brief descriptions of the drawings below are accompanied by the detailed description of the invention herein.

DETAILED DESCRIPTION OF THE INVENTION

Figure 1:
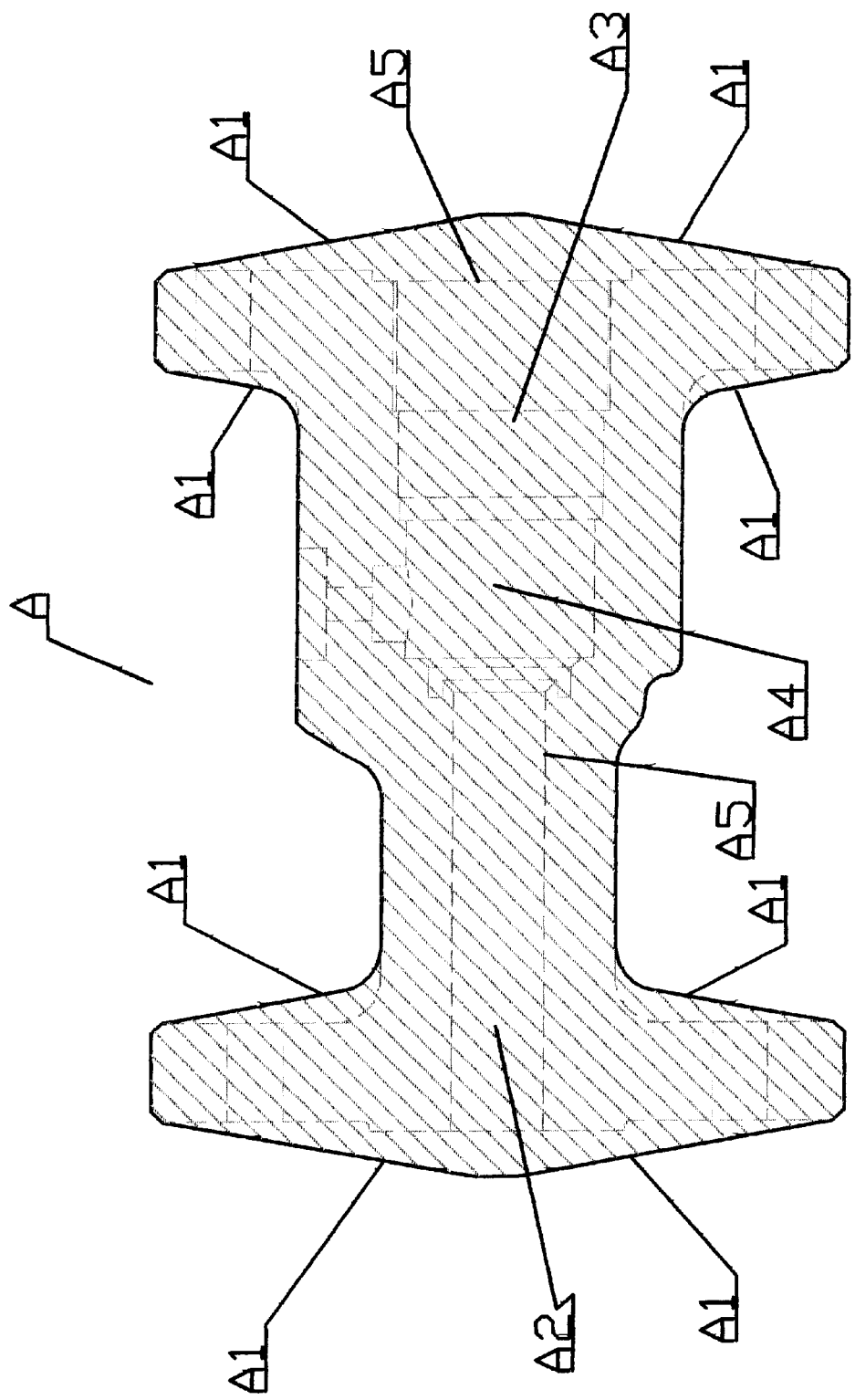
FIG. 1 is an cross-sectional drawing of a conventional one-piece flange-type ball valve, with the areas of the practical forged initial blank requiring finishing delineated.
Figure 2:
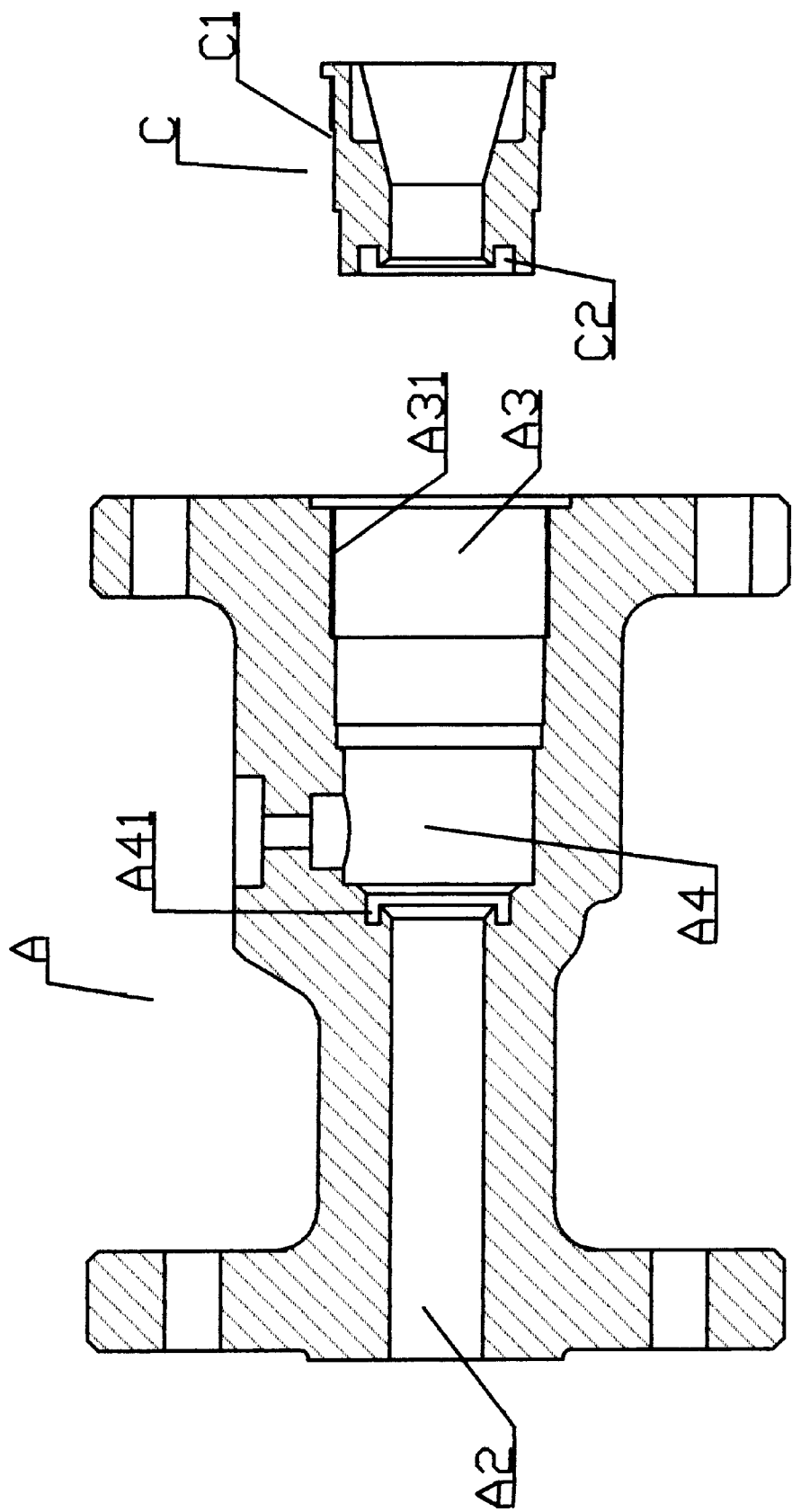
FIG. 2 is a cross-sectional drawing of a finished conventional one-piece flange-type ball valve and plug before assembly.
Figure 3:
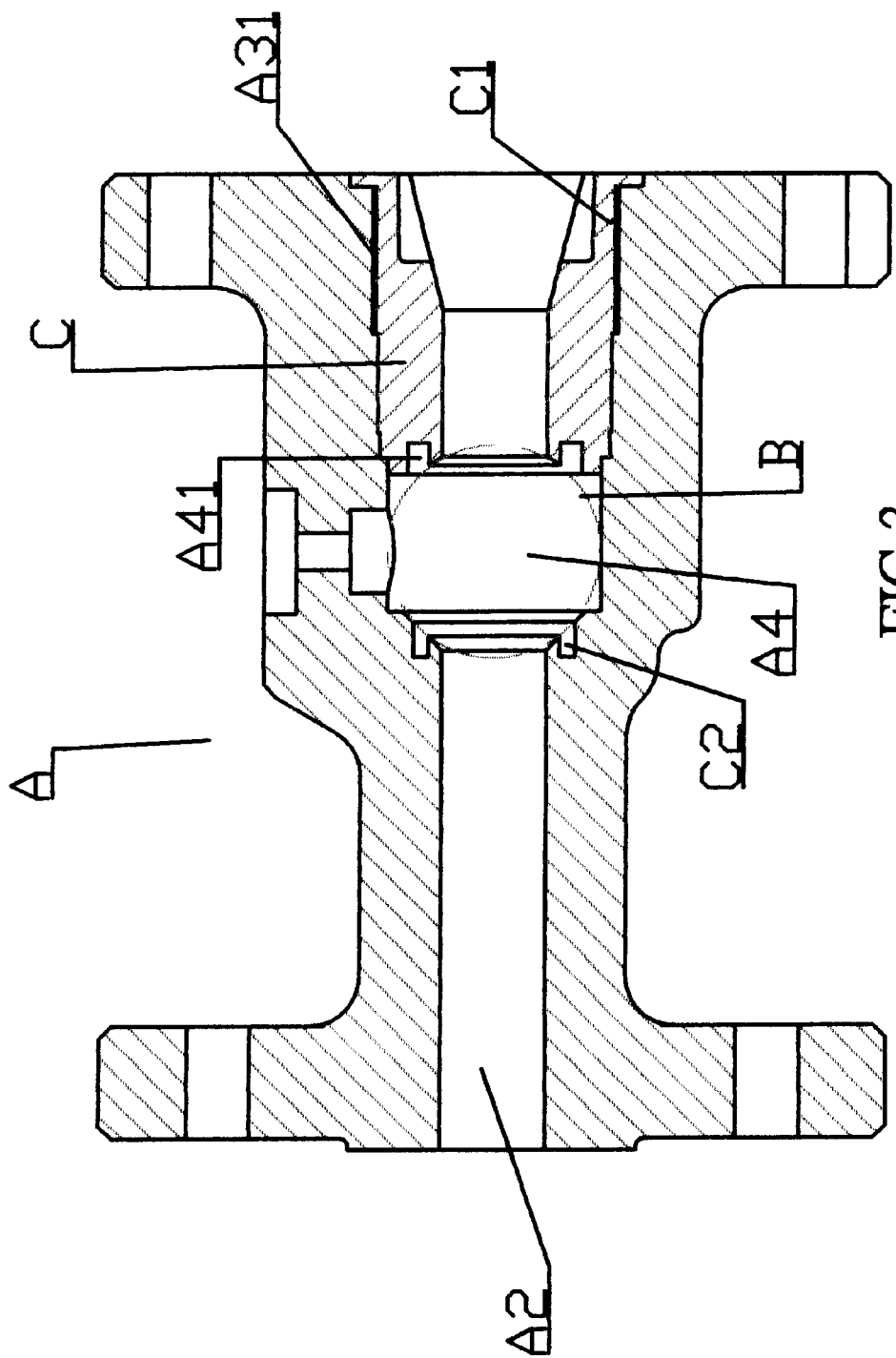
FIG. 3 is a cross-sectional drawing of a partially assembled conventional one-piece flange-type ball valve.
Figure 4:
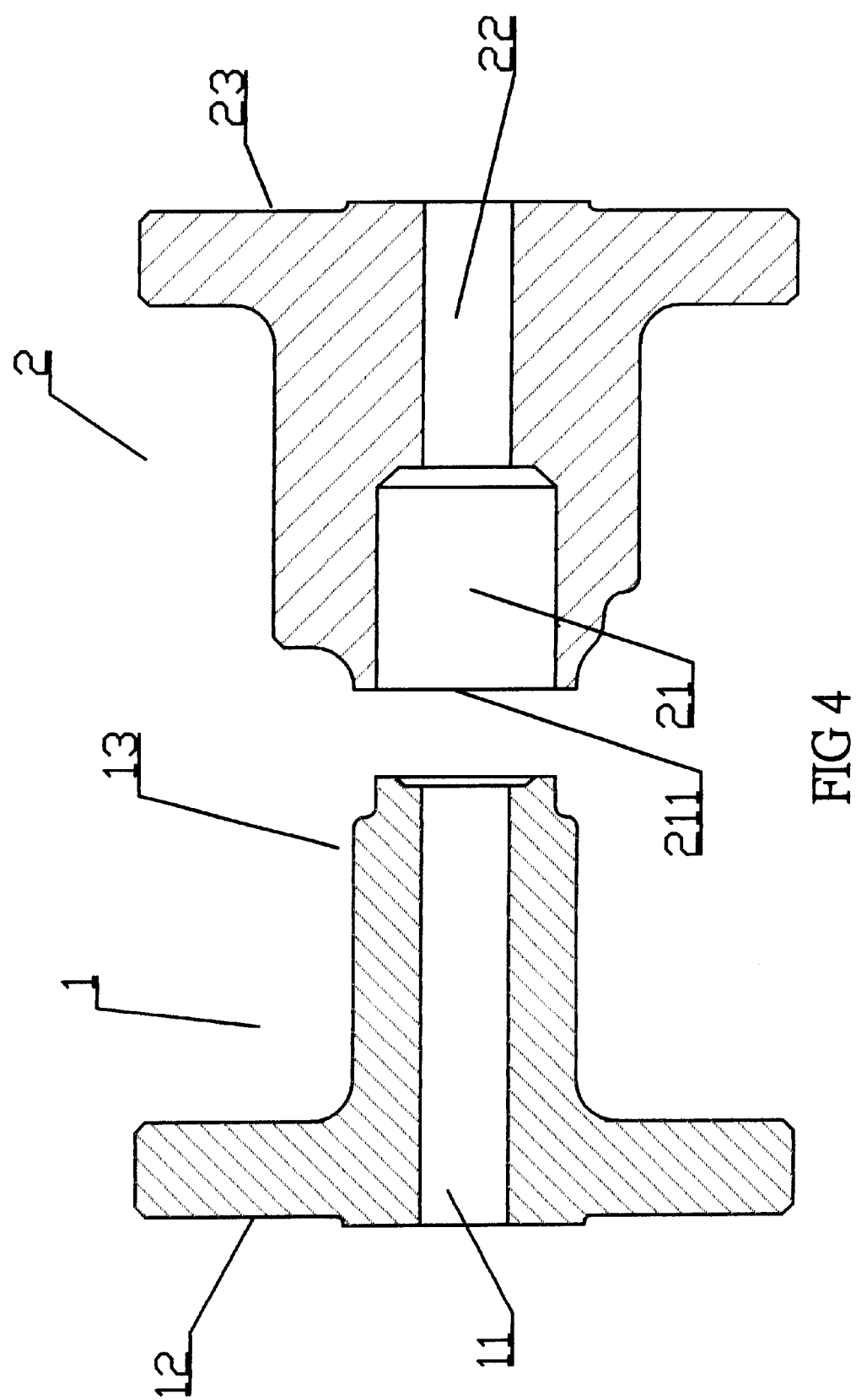
FIG. 4 is a cross-sectional drawing of the forged main component blanks of the one-piece flange-type ball valve of the invention herein.
Figure 5:
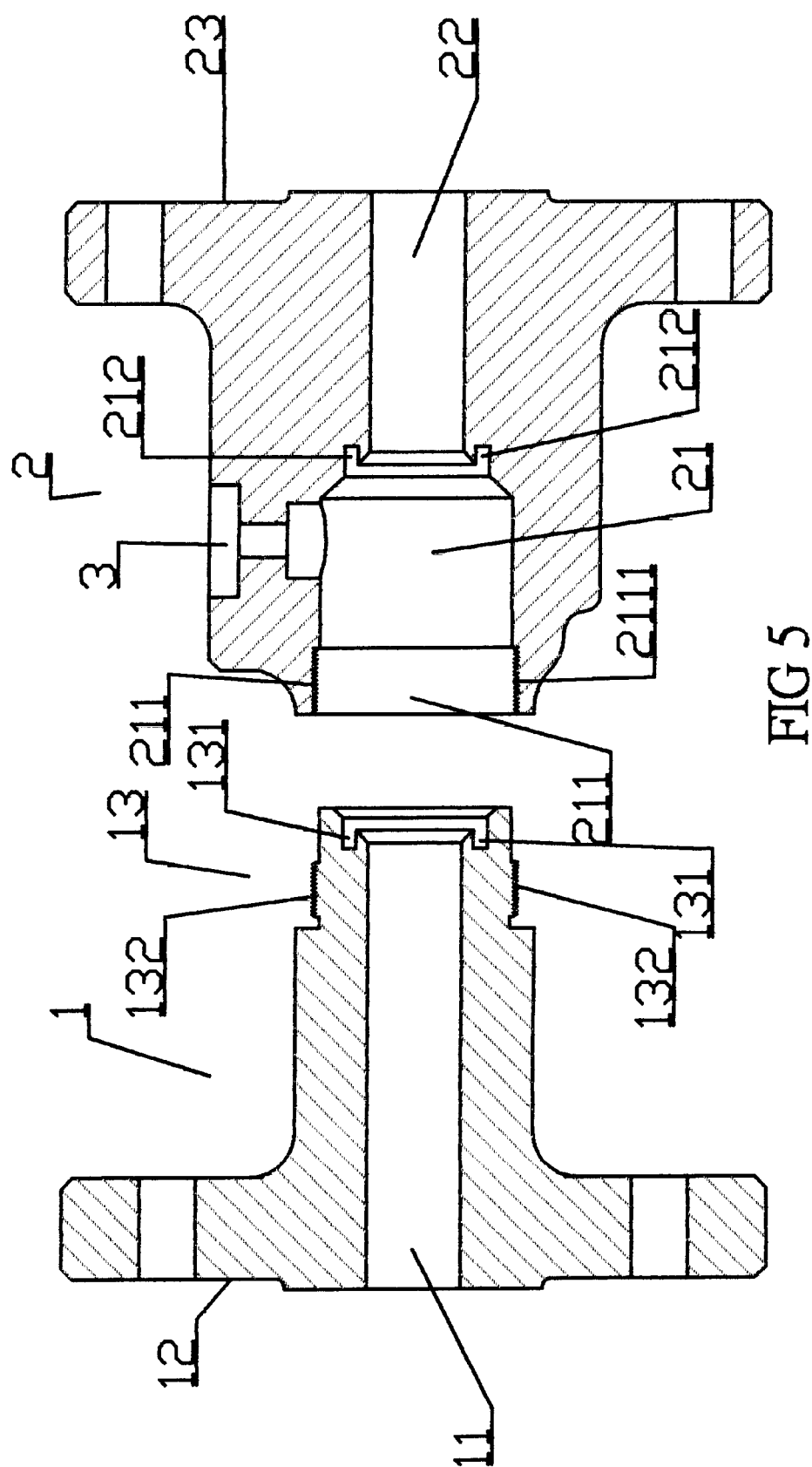
FIG. 5 is a cross-sectional drawing of the finished main component blanks of the one-piece flange-type ball valve of the invention herein.
Figure 6:
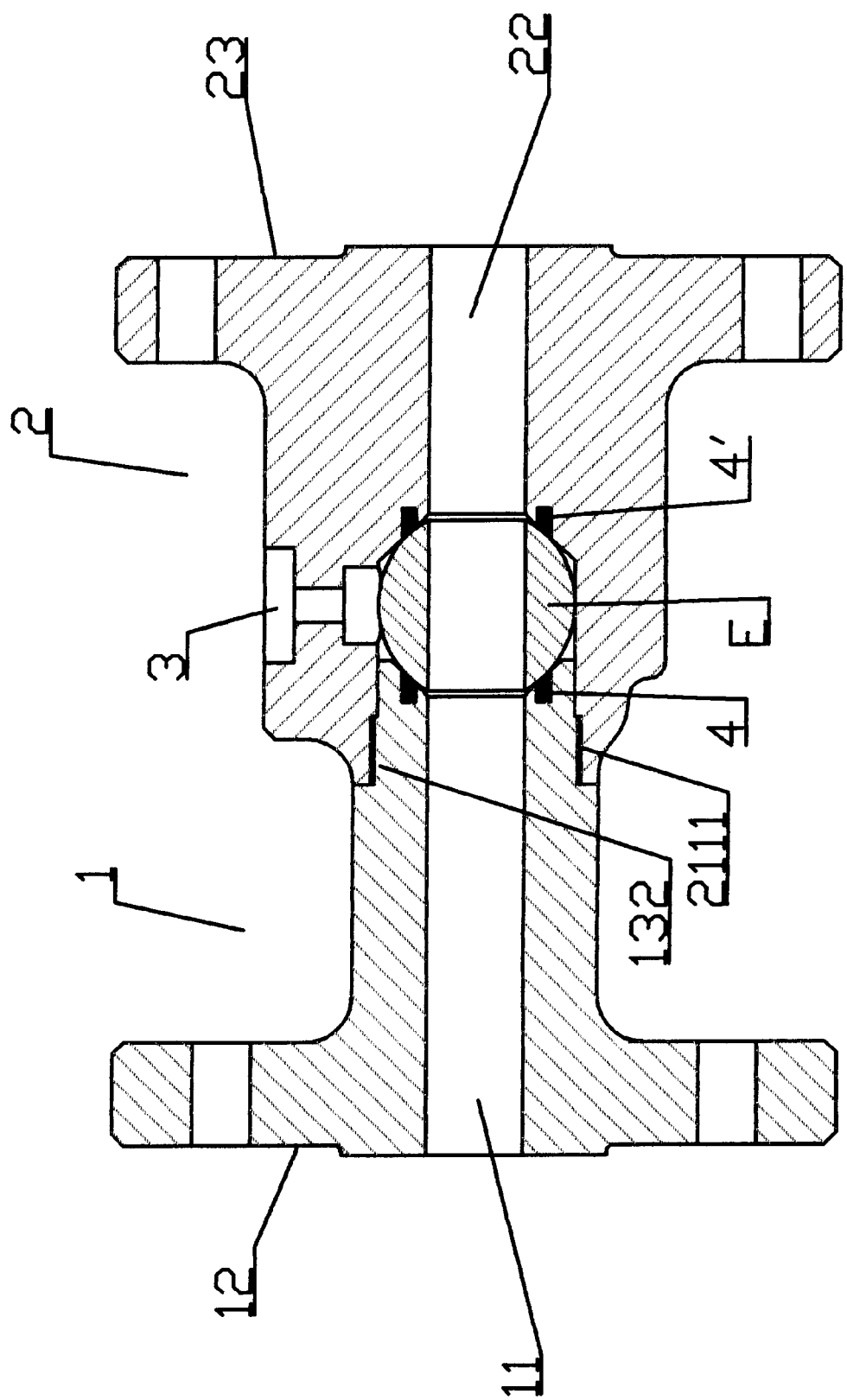
FIG. 6 is a cross-sectional drawing of the partially assembled one-piece flange-type ball valve of the invention herein.

Referring to FIG. 4, the forged initial blanks of the water inlet seat 1 and the ball valve seat 2 of the one-piece flange-type ball valve of the invention herein, the said water inlet seat 1 has a water inlet port 11 and a left pipeline connection section 12 already formed inside; the said ball valve seat 2 has a ball valve chamber 21, its contiguous water outlet port 22, and a right pipeline connection section 23 already formed inside; and the said forged initial blanks do not require further machining, which lessens the finishing time and materials required; referring to FIG. 5 and FIG. 6, the mating section 13 at the front end of said water inlet seat 1 to the ball valve chamber 21 of the ball valve seat 2 is shallower to facilitate easier finishing; a left water-tight gasket containment recess 131 is lathed in the mating section 13 end surface of the water inlet seat 1 and external threads 132 are died along the outer sides of the said mating section 13; furthermore, internal threads 2111 are tapped in the connection hole 211 at the front end of the ball valve chamber 21 of the ball valve seat 2, enabling the screw fastening of the external threads 132 of the water inlet seat 1 into the connection hole 211, and a right water-tight gasket containment recess 212 is formed at the adjoining end surfaces between the water outlet port 22 and the ball valve chamber 21 and then a handle mounting hole 3 is drilled, and after the left and the right water-tight gaskets 4 and 4' are inserted into the left and the right water-tight gasket containment recesses 131 and 212, the ball valve E is placed inside the ball valve chamber 21, after which the external threads 132 of the water inlet seat 1 mating section 13 are coated with a thread locking agent and screw fastened to the internal threads 2111 in the connection hole 211 of the ball valve seat 2, causing the left and the right water-tight gaskets 4 and 4' to rest against the two spherical surfaces of the ball valve E, and thereby retaining forged material strength, avoiding the occurrence of pitting, reducing defect rates, allowing easier finishing, lessening material wastage, lowering production costs and, furthermore, minimizing component fabrication and shortening the manufacturing time.

Referring to FIG. 5 and FIG. 6, when the initial blanks of the water inlet seat 1 and the ball valve seat 2 for the one-piece flange-type ball valve are forged, the water inlet port 11 of the water inlet seat 1 and the water outlet port 22 of the ball valve seat 2 are of the same bore diameters and, after being placed inside the ball valve chamber 21, the ball valve E rests against the water-tight gasket 4' of the water outlet port 22, then the mating section 11 of the water inlet seat 1 is inserted and fastened into the connection hole 211 of the ball valve seat 2, causing the water-tight gaskets 4 and 4' at the two sides to be flush against the ball valve E, thereby achieving rapid assembly and, furthermore, reducing the plug component portions and the respective finishing time to effectively reduce both the production cost and the defect rate.

In summation of the foregoing section, the practical forging method of the invention herein, as applied to the forging of the water input seat and ball valve seat for a one-piece flange-type ball valve, simplifies the finishing process and saves both material and time, while also effectively eliminating the pitting and rough edges produced in conventional casting as well as the material wastage and complex finishing involved in conventional casting. Since the invention herein raises production capacity and quality, reduces defect rates, increases production output, lowers production costs, and is capable of increasing market share, the invention herein complies with the promotion of industrial development requirement of the Patent Law and is hereby submitted to the Patent Bureau for review and the granting of the commensurate patent rights.

What is claimed is:

1. A method of fabricating a flange-type ball valve comprising the steps of:
    a) forging an inlet seat portion having a mating section, a first pipeline connection section with a first connecting flange extending outwardly therefrom, and an inlet port extending through the inlet seat portion;
    b) forging a ball valve seat portion having a second pipeline connection section with a second connecting flange extending outwardly therefrom, an outlet port extending through the ball valve seat portion, a ball valve chamber communicating with the outlet port, and a connecting hole;
    c) forming a first gasket containment recess on an end portion of the mating section;

d) forming a second gasket containment recess in the ball valve seat portion in communication with the ball valve chamber;

e) forming a first threaded portion on the mating section;

f) forming a second threaded portion on the ball valve seat portion in the connecting hole;

g) forming a handle mounting hole in the ball valve seat portion;

h) placing first and second gaskets in the first and second gasket containment recesses respectively;

i) placing a ball valve in the ball valve chamber; and, j) engaging the first and second threaded portions so as to attach the inlet seat portion to the ball valve seat portion such that the ball valve is in contact with the first and second gaskets.

2. The method of claim 1 wherein the first threaded portion has external threads and the second threaded portion has internal threads.

* * * * *